United States Patent [19]

Ney et al.

[11] Patent Number: 5,613,034
[45] Date of Patent: Mar. 18, 1997

[54] METHOD AND APPARATUS FOR RECOGNIZING SPOKEN WORDS IN A SPEECH SIGNAL

[75] Inventors: Hermann Ney; Volker Steinbiss, both of Aachen, Germany

[73] Assignee: U.S. Philips Corporation, New York, N.Y.

[21] Appl. No.: 312,495

[22] Filed: Sep. 26, 1994

Related U.S. Application Data

[63] Continuation of Ser. No. 944,560, Sep. 14, 1992, abandoned.

[30]  Foreign Application Priority Data

Sep. 14, 1991 [DE] Germany .......................... 41 30 632.5

[51] Int. Cl.⁶ ............................................... G10L 9/00
[52] U.S. Cl. ............................................... 395/2.6
[58] Field of Search ................... 395/2, 2.63, 2.6–2.62; 381/43

[56] References Cited

U.S. PATENT DOCUMENTS

| | | | |
|---|---|---|---|
| 4,803,729 | 2/1989 | Baker | 381/43 |
| 4,903,305 | 2/1990 | Gillick et al. | 381/41 |
| 4,947,438 | 8/1990 | Paeseler | 381/43 |
| 5,208,897 | 5/1993 | Hutchins | 395/2 |

FOREIGN PATENT DOCUMENTS

| | | |
|---|---|---|
| 3215868 | 11/1983 | Germany . |
| 3710507 | 10/1988 | Germany . |
| 3930889 | 3/1991 | Germany . |

*Primary Examiner*—Allen R. MacDonald
*Assistant Examiner*—Patrick N. Edouard
*Attorney, Agent, or Firm*—Debra K. Stephens

[57] ABSTRACT

In the recognition of coherent speech, language models are favourably used to increase the reliability of recognition, which models, for example, take into account the probabilities of word combinations, especially of word pairs. For this purpose, a language model value corresponding to this probability is added at boundaries between words. In several recognition methods, for example, when the vocabulary is built up from phonemes in the shape of a tree, it is not known at the start of the continuation of a hypothesis after a word end which word will actually follow, so that a language model value cannot be taken into account until at the end of the next word. Measures are given for achieving this in such a manner that as far as possible the optimal preceding word or the optimal preceding word sequence is taken into account for the language model value without the necessity of constructing a copy of the searching tree for each and every simultaneously ending preceding word sequence.

8 Claims, 3 Drawing Sheets

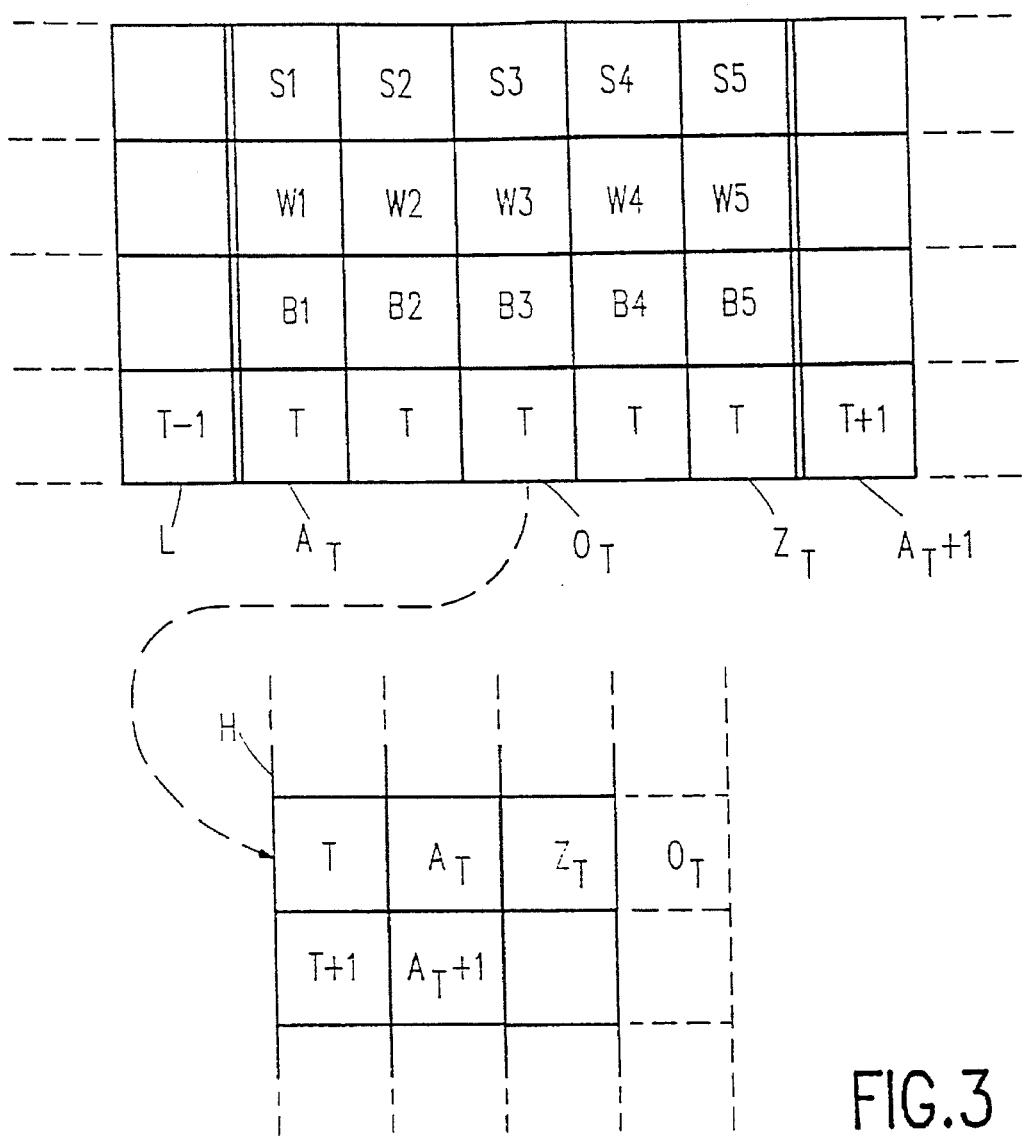
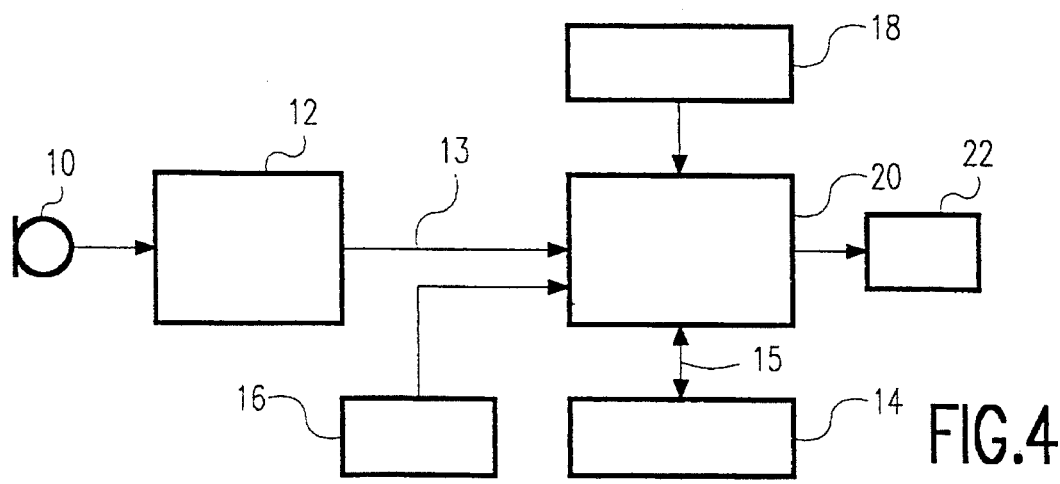
FIG.3
FIG.4

METHOD AND APPARATUS FOR RECOGNIZING SPOKEN WORDS IN A SPEECH SIGNAL

This is a continuation of application Ser. No. 07/944,560, filed Sep. 14, 1992 now abandoned.

FIELD OF THE INVENTION

The invention relates to a method for recognizing a sequence of words in a speech signal, said method comprising the steps of:

- at recurrent instants sampling said speech signal for generating a series of test signals and executing a signal-by-signal matching and scoring between said test signals and various series of reference signals from a unitary set of reference signal series that each represent a vocabulary word;
- at a particular first test signal assigning a first score to any first string of preliminarily recognized words terminating at said first test signal.

DE-PS-32 15 868 describes a method for speech recognition with usage of dynamic programming for adaption to time warp between the sequence of test signals and the sequence of reference signals. Moreover, a certain degree of optimization for determination of word transitions is realized. The search through the entire vocabulary is continued in this case whenever a word end is reached. This leads to a very large searching space, which requires much calculation time in the case of a large vocabulary of 10.000 words or more, so that the recognition is time-consuming.

An improved method is known, from DE-OS 37 10 507. In this method, the searching space is kept small through regularly comparing all hypotheses with a threshold value. Reliability is increased through the use of a language model in which syntactic interrelationships are taken into account, for example, in the form of statistic probabilities. In this process, at the end of every word a language model value is added to the words which are subsequently included in the comparisons, which language model value in the case of a bigram language model depends on the combination of the new word just begun and the preceding word, or the n-1 preceding words in the case of an n-gram language model. For this it is necessary that the identity of each new word included in the comparison is known.

This latter condition, however, is not fulfilled in many recognition methods. Particularly, this is the case in a recognition method in which the vocabulary is built up from, for example, phonemes in the form of a tree list, as described in DE Patent Application 41 30 631.7 with the same priority date as the present document and herein incorporated by reference. In this method, many different words may start with the same phoneme. Therefore, in this method the beginnings of the words are no longer available separately, and no language model in which the probability of a word depends on the preceding word or passage can be used anymore without special measures. If, for example, a bigram language model is used, copies would have to be made of the vocabulary or its beginning in the searching space all the time, these copies representing the contexts modelled by the language model before the word under consideration, i.e. for example the preceding word or a category assigned to the preceding word. This would considerably increase the required searching activity.

SUMMARY OF THE INVENTION

Now, amongst other things it is an object of the present invention to easily accommodate for usage of a language model in a method according to the preamble.

Now, according to one of its aspects, its object is realized by

- as from a particular second test signal subsequent to said first test signal continuing said signal by signal matching and scoring for appropriate further series of reference signals of the above set until attainment of a subsequent word termination at a further first test signal, each such further series representing said subsequent word so producing a sub-score;
- for each such further series retrieving an n-gram language model score (n>2) determined through a combined identity of said subsequent word and of (n−1) most recent vocabulary words at the preliminary recognized word string terminating at said first test signal;
- adding said first score, said sub-score and said language model score for producing further said first score, an indication of said further first score, an indication of said subsequent word and a backpointer to said first test signal being stored in a region of a result list associated to said further first test signal;
- selecting coexistent minimum first score values for so preliminarily recognizing any associated word string but otherwise discarding first strings;
- recognizing said sequence as represented by a non-discarded said first string on the basis of an associated minimum value among various first scores in the result list.

Now, in a recognition with a large vocabulary, it very often occurs that each or nearly each test signal represents the termination instant of one or more words. At that instant therefore, not only the best score is retained, but all words are stored with the relevant indications. For any of these stored words, at least the optimal preceding word has then been taken into account and when the following word ends, the correspondingly optimized values are used for determining the optimal preceding word for this case, i.e. it is ascertained for each ending word which score would have been obtained at the end of this word if this word had followed the various preceding words, the correct language model value being taken into account each time. This is also true when within a particular word two or more different hypotheses recombine, which may have started at different moments, i.e. at different second test signals. This may cause a certain error as to the optimal word boundary; however, research has shown that this error on average practically does not affect the total recognition result.

Since with every test signal the indications for the ends of several words are stored, it is necessary to collect all these indications at subsequent word ends, independently of how the backpointer is formed. According to an embodiment of the invention, it is for this purpose favourable that an indication of every region of the results list is stored in an auxiliary list for each test signal. Such an auxiliary list requires only a small storage space and contains at each list position, for example, an indication as to the first and the last list position of the relevant region of the results list.

This auxiliary list is favourable but not essential to obtain the indications of the particular word ends when they are necessary for determining the further first scores. A number of possibilities to obtain these indications in a simple and quick way with and without the auxiliary list are recited in dependent claims.

The invention also relates to an apparatus for speech recognition, operating according to the foregoing principles.

BRIEF DESCRIPTION OF THE FIGURES

For a fuller understanding of the invention, reference is had to the following description taken in connection with the accompanying drawings, in which:

FIG. 3 shows the use of an auxiliary list;

FIG. 4 shows a simplified block diagram of a device for speech recognition.

DETAILED DESCRIPTION OF THE PREFERRED EMBODIMENTS

Figure 1:
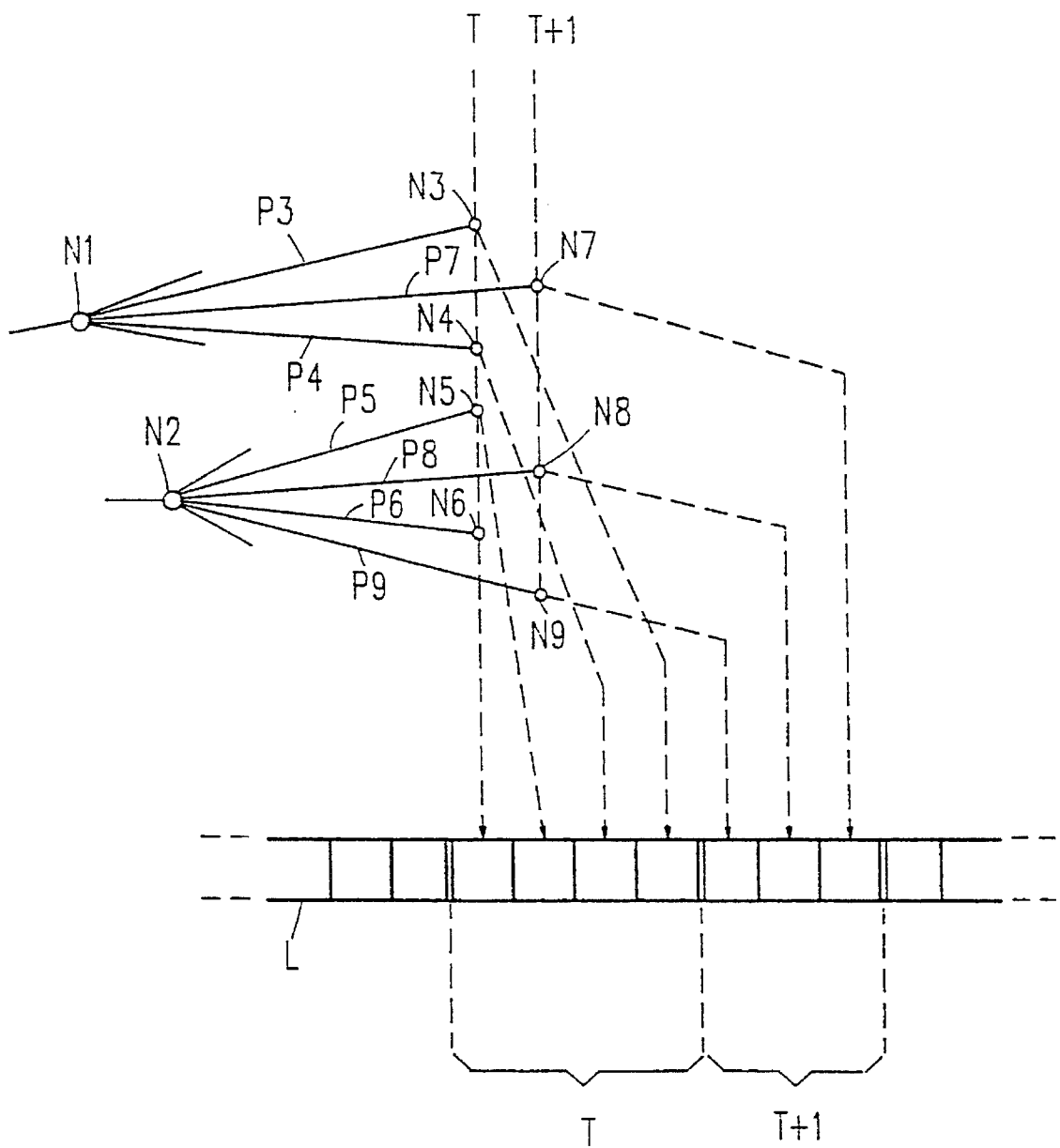
FIG. 1 symbolically shows several ending sequences and their storage.

FIG. 1 symbolically shows the progress of a few preliminary hypotheses which start at different moments, i.e. at different test signals. A first group of hypotheses starts at junction N1 at a moment immediately after a string of words has ended, which has not been shown. The line running from the left towards the junction N1 represents the preceding portion of the hypotheses.

At a later moment, a further number of partial hypotheses starts at the junction N2, for example, at the test signal next to the test signal of junction N1.

Each partial hypothesis represents the comparisons of consecutive test signals with reference signals of each of a sequence of reference signals, in which each word is represented by a spearate sequence of reference signals, as described in DE-OS 32 15 868 referred to above. According to another solution, the partial hypothesis consists of a chain of phonemes each with a sequence of reference values, as described in Patent Application 41 30 631.7 (PHD 91-138) having the same priority date and mentioned above, with the vocabulary built up from phonemes as a tree structure, herein incorporated by reference.

Two partial hypotheses referenced P3 and P4 in FIG. 1 start from the junction point N1 and reach a word end at the moment T, in junctions N3 and N4, respectively. A further partial hypothesis P7 ends at the next moment T+1 in junction N7. Further partial hypotheses running from the junction N7 are schematically without showing of their ends.

Starting from the junction N2, the partial hypotheses P5 and P6 terminate at junctions N5 and N6, respectively, at the moment T. Similarly, the partial hypotheses P8 and P9 terminate at junctions N8 and N9, respectively, at the moment T+1.

It is also possible here that partial hypotheses starting from the junctions N1 and N2 have identical reference value sequences, but are relatively shifted in time. Such hypotheses may come together within the sequence or at the end. Such moment the partial hypothesis having the lowest score is continued.

Indications as to every ending word are now stored in a results list L which is represented diagrammatically here as a row of fields. Each field of the list L represents a list position with which a memory address is associated. The indications of the words which end at a given moment are stored in a corresponding region of the list L. Thus the words N3 to N6, which end at moment T, are stored in region "T" of the results list L. Similarly, the indications of the words corresponding to junctions N7 to N9 ending at moment T+1 are stored in a subsequent, likewise indicated region "T+1".

These indications eventually serve to render it possible, starting from the word which ends at the conclusion of the total speech signal, to trace back the word chain preceding this word and having the best evaluation result, in order to provide an output of recognized words. The generation of the indications necessary for this is explained below in more detail with reference to FIG. 2, wherein a bigram language model is used by way of example.

Figure 2:
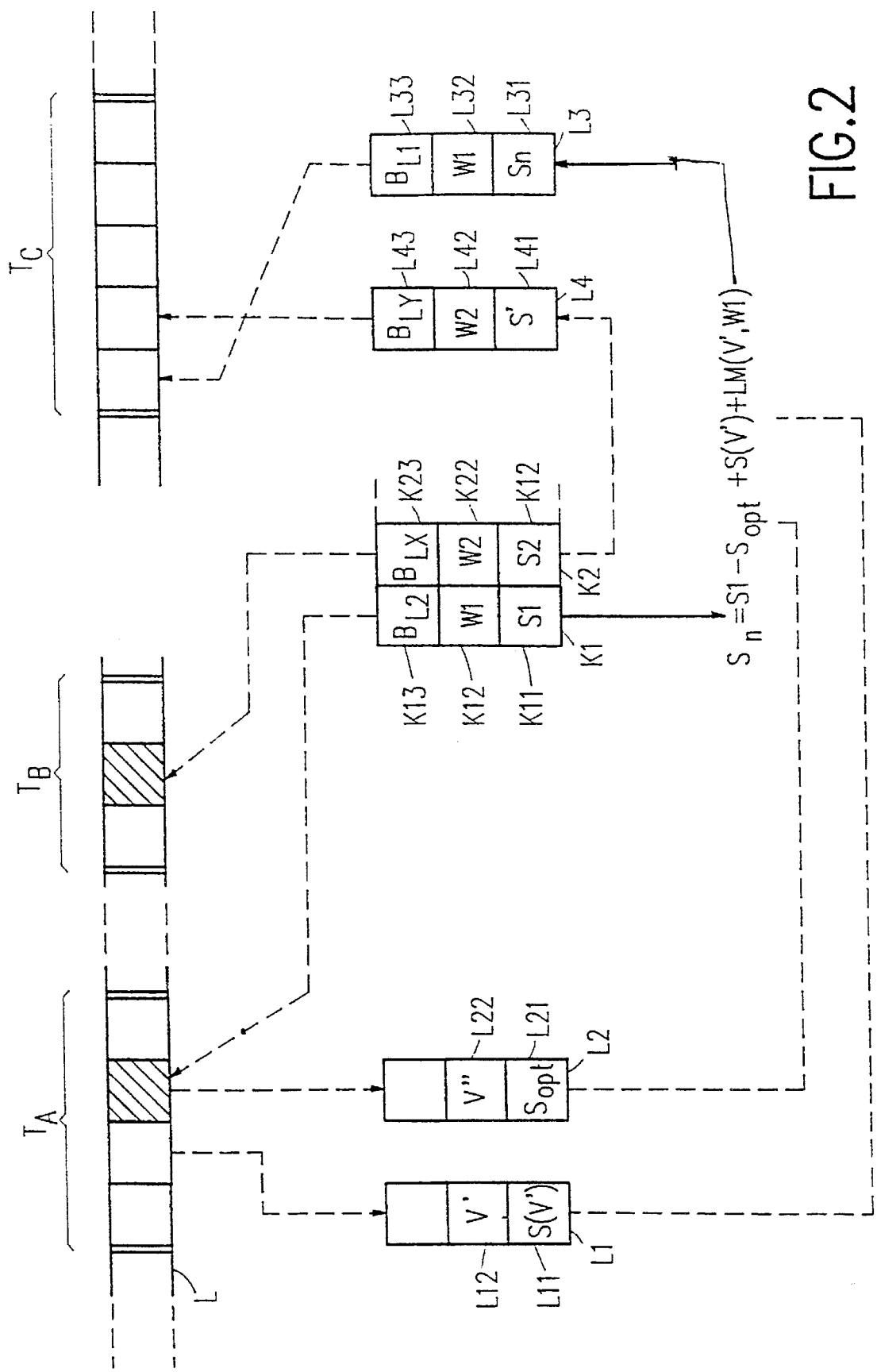
FIG. 2 shows in more detail the procedures upon reaching word ends for the determination of the new information to be stored.

In FIG. 2, the results list L is again represented as a row of fields, in which each region $T_A$, $T_B$ and $T_C$ is coherent and contains indications of respective words which each have ended at the same moment, i.e. at the same test signal. The region $T_A$ comprises four fields, i.e. at this moment T A four words have ended. The hatched field has assigned the word which had the lowest score of all simultaneously ending words. New partial hypotheses are continued with this score, as is indicated in FIG. 1 starting from junction N1.

Likewise, region $T_B$ comprises three fields, i.e. three words have ended at moment $T_B$, and here again the hatched field contains the word with the lowest score, with which new partial hypotheses are started from this instant or more exactly from the immediately following instant, as is indicated in FIG. 1 starting from junction point N2.

Now assume that at instant $T_C$ word ends are reached of which a first word belongs to a hypothesis coming from $T_A$ and at least a second word belongs to a hypothesis coming from $T_B$. The first word is indicated with W1, and a score S1 is reached at this end. These indications are present in a symbolically shown memory field K1 where the scores are memorized for searching. As shown, memory location K11 contains the score S1, location K12 contains the word identification W1, and location K13 contains a backpointer $B_{L2}$ to the hatched field of region $T_A$. Memory field K2 contains similar indications for word W2.

It is now to be ascertained which of the words whose indications are stored in the region $T_A$ is the optimal predecessor word. Generally, but not always, this will be the word of region $T_A$ that itself has the lowest score. The exception, which is not improbable, is that such word in combination with the next word W1 gets a high language model score, indicating a low probability for this combination. On the other hand, a word of region $T_A$ that itself had a higher score, might in combination with word W1 get a lower language model score, indicating a higher probability for this combination. According to the particular circumstances, one or the other combination could have the lower ultimate score.

For this purpose, the first backpointer $B_{L2}$ in the memory location K13 is now used for reading out the corresponding field of the results list L whose contents are indicated with L2 in FIG. 2. The optimal score $S_{opt}$ is present in the location L21 of field L2. Subsequently, all fields of the region $T_A$ are read out. The field L1 which contains the score S (V') in the location L11 being represented in more detail by way of example. The optimal preceding word $V_{opt}$ of the word W1 must now fulfil the following condition:

$$V_{opt} = \underset{V}{\arg\min} \ [S1 - S_{opt} + S(V) + LM(V, W1)]$$

Herein, the minimum value of the expression in square brackets is to be determined in the set of words that has symbolically been indicated by V. Now, the first value S1 represents the score that has been produced from the start of the recognition up to the word W1. The subtraction by $S_{opt}$ is done for reasons of normalisation. S(V) is the score of the separate word V itself. The final term is the language model score for the combination of the word W1 as direct successor to the respective word V. Now, it is assumed for the example of FIG. 2 that the word V' stored in field L1 represents the optimal preceding word. A new score $S_n$ for the end of the word W1 is then formed in the following manner:

$$S_n = S1 - S_{opt} + S(V') + LM(V', W1)$$

This new score was already formed during the search for the optimal preceding word in accordance with the first equation.

Now the contents of the field L3, which here represents the first field to be filled in the region $T_C$ of the results list L, can be determined. The new score $S_n$ is entered into location L31 of the memory field L3, the word identity W1 is directly transferred to the memory location L32, and the backpointer $B_{L1}$ to the field L1 in the region $T_A$, which contains the optimal preceding word V', is entered into location L33 as an indication to the preceding word. In this manner, when the first field in the region $T_C$ of the results list L is called after the end of the speech signal during the trace back of the optimal word chain, the field L1 of the preceding word is immediately found, containing a corresponding indication as to the next preceding word, etc., so that the correct word order is immediately and unequivocally found.

In FIG. 2, the values to be written into the second field of the region $T_C$ of the results list for the further ending word W2, for which the values indicated in the field K2 are created are found in a similar manner. The backpointer $B_{LX}$ contained in the field K23 addresses the hatched field of the region $T_B$ for the word having the lowest score in this region, and a new score S' is determined from the score S2 in field K21 for the word W2 and from the optimal preceding word, in a similar manner as described above, and entered into location L41 of the field L4, which receives the backpointer $B_{LY}$ as to the field of the optimum preceding word in the region $T_B$ in field L43.

It was assumed in the example of FIG. 2 that for carrying along as an indication about the beginning of a sequence the address of the list position of the results list L, which contains the indications for the word having the lowest score at the moment immediately preceding the beginning, is used as backpointer and that the other fields of the results list L belonging to this moment are read out. These list positions may be determined in various ways, and there are also various possibilities for the backpointer which is carried along, as will be explained below with reference to FIG. 3.

In FIG. 3, a section of the symbolically represented results list L is shown in more detail. Each field, i.e. each list position, comprises several locations, as shown in FIG. 2. However, in FIG. 3 each field is indicated as having four locations. Of the five central fields, which together contain the indications about a certain moment T, i.e. a specific test signal, as is indicated in the bottom locations of these five fields, the next locations upwards contain backpointers B1 to B5 to the beginnings of the words W1 to W5 which are indicated in the locations situated one row higher, or more exactly to the beginnings of the sequences belonging to these words or to the sequences ending immediately before, while in the uppermost locations the scores S1 to S5, which were reached at the ends of the words W1 to W5, or indications to scores derived therefrom, are present. The field shown on the extreme left is the last one of a region of fields belonging to the previous moment T−1, and the field shown on the extreme fight belongs to the next moment T+1.

Starting from FIG. 2 and the accompanying explanation, it is first assumed that the address of the list position containing the indications of the word having the smallest score immediately before the start of the new sequence is carried along as the backpointers to the beginning of a sequence. Assume that this is the central list position in FIG. 3, i.e. the field indicated with $O_T$. The score S3 indicated therein then corresponds to the optimal score $S_{opt}$ as indicated in FIG. 2. On the other hand, the time index T is derived from the bottom location of this field $O_T$, with which time index a likewise identified memory location of an auxiliary list H is addressed. In this auxiliary list, the address $A_T$ of the first list position of the results list L belonging to the moment T is indicated for the index T. Furthermore, the address of the final list position $Z_T$ of the region belonging to the moment T is indicated. All five list positions can accordingly be addressed unequivocally by means of this auxiliary list.

It is alternatively possible to indicate only one of these list positions, for example, the list position $A_T$, since the last list position can be determined from this in that it lies immediately before the list position $A_{T+1}$ which is contained in the next list position T+1 of the auxiliary list H.

Another possibility where the use of the auxiliary list H is not required consists in that the adjoining list positions are read out after accessing of the list position $O_T$ of the results list L until a list position appears which contains a different time index in its last field. In this way all list positions belonging to the moment T can also be determined.

A yet further possibility consists in that not the address of a list position of the results list, but the time index of the moment immediately preceding the beginning is carried along as the backpointer to the beginning of a sequence. In that case, for example, the field K13 would directly contain a time index in FIG. 2. The corresponding list position of the auxiliary list H can then be found directly and the list positions of the results list L which are to be read out consecutively can then be derived from this. In this case, the bottom positions of the results list L shown in FIG. 3, which contain the time index, may be dispensed with. To find the list position having the lowest score result, which is necessary for the search after the optimal preceding word, the scores of all list positions from $A_T$ to $Z_T$ can be compared with one another. It is also possible to store directly the list position $O_T$, which is assigned to the word having the smallest score, in the auxiliary list, as is indicated with interrupted lines in the auxiliary list H on the fight.

It is also possible, finally, when a time index is carried along as the backpointer to the beginning of a sequence, to store not the scores themselves, but the differences with the optimal score in the first locations of the results list L. In this case it is not necessary to know the list position in the results list L in which the optimum score is present. Instead, a slightly modified equation holds for the determination of the optimal preceding word and for the associated new score $S_n$:

$$S_n = S1 + \Delta S(V') + LM(V', W1)$$

in which $\Delta S(V')$ is the difference between the score of the word V' and the lowest score of all words ending at the same moment. This even leads to fewer calculations for determining the optimal preceding word, but this is counterbalanced by an additional calculation activity for determining the differences in score which are now stored as indications to the score at the respective first locations of the fields in the results list L.

It should be recognized, therefore, that a plurality of options is available for determining the fields of the results list which are to be read out for finding the optimal preceding word.

The measures described above can also be favourably applied when not only the most probable word sequence is to be determined, which at the same time has the greatest resemblance to the speech signal, but when several word sequences with the next lowest probability are to be determined, as described in DE-OS 39 30 889.

FIG. 4 shows a simplified block diagram of a device for speech recognition.

In FIG. 4, the speech signal obtained through microphone 10 is preprocessed in a device 12, in particular the spectral components are digitized for consecutive speech signal sections, whereby the totality of the values which each represent a speech signal section forms a test signal. These test signals, which are present at line 13, are supplied to the recognition device 20. This recognition device constructs various hypotheses using reference signals contained in memory 16. Finally, the device 20 supplies the sequence of recognized words to an output device 22, for example, a display or a printer.

The device 20 for the actual recognition may be realized according to patent DE-OS-37 10 507. During the search, i.e. during processing of the consecutive test signals, a plurality of hypotheses is built up in that case in a searching space comprising the test signals and the reference signals, so that hypotheses with an unfavourable score that exceeds a threshold value, are discontinued, and whenever a possible word end is reached, a branching into a number of hypotheses leading further into new words to be started, which are determined on the basis of the language model. Generally, the use of the above searching space has been described in a paper by H. Ney et at., A data driven organization of the dynamic programming beam search for continuous speech recognition;© 1987, IEEE, No. CH 2396-0/87/0000/0633.

During search, intermediate results are written into a result memory 14. Intermediate results are in the present example all words terminating during search, together with associated scores or indications to scores and indications to relevant predecessor words. Continuations in the search are based on selecting one or more minimal scores. The further scores for consecutive words terminating during the continuation of the search are determined by using preceding scores which have to be read from the result memory 14 and supplied to the device 20. The connection 15 between result memory 14 and device 20 is bidirectional for that reason. The further scores are determined from the scores of the terminating words themselves and the scores read out from result memory 14, incremented with languale model values from a memory 18 for the combination of the terminating word and the chain of the most recently preceding words. This chain comprises one word (bigram), two words (trigram), etc. At the end of the speech signal the device 20 determines the sequence of words having highest probability on the base of the minimum overall score via the result memory.

What is claimed is:

1. A method for recognizing a sequence of words in a speech signal, said method comprising the steps of:

at recurrent instants, sampling said speech signal for generating a series of test signals and executing a signal-by-signal matching and scoring between said test signals and various series of reference signals from a unitary set of reference signal series that each represent a vocabulary word;

assigning a first score to any first string based on a first test signal of preliminarily recognized words terminating at said first test signal;

as from a particular second test signal subsequent to said first test signal, continuing said signal-by-signal matching and scoring for appropriate further series of reference signals of the above set so as to take along a backpointer to said first test signal indicating the terminated words until attainment of a subsequent word termination at a further first test signal, each such further series representing said subsequent word so producing a sub-score;

for each such further series, retrieving an n-gram language model score (n≧2) determined through a combined identity of said subsequent word and of (n–1) most recent vocabulary words at the preliminary recognized word string indicated by said backpointer;

adding said first score, said sub-score and said language model score for producing further said first score, an indication of said further first score, an indication of said subsequent word and said backpointer being stored in a region of a result list associated to said further first test signal;

selecting at least one minimum first score for so preliminarily recognizing a word string associated with said minimum first score.

2. A method as claimed in claim 1, characterized in that an indication of every region of the results list is stored in a separate list portion of an auxiliary list for each test signal.

3. A method as claimed in claim 1, characterized in that with each further first score an indication as to the corresponding further first test signal is stored in the results list.

4. A method as claimed in claim 1, characterized in that a list position within the region of the results list at which the indication of the minimum further first score is stored is carried along during continuing said matching and scoring as the backpointer.

5. A method as claimed in claim 2, characterized in that the list position of the auxiliary list associated to the further first test signal is carried along as the backpointer.

6. A method as claimed in claim 5, characterized in that to determine the sub-score, the minimum first score is subtracted from the score at the relevant subsequent word termination.

7. A method as claimed in claim 5, characterized in that the indication of the further first score is the difference between the score obtained at the terminating particular word and the minimum score of all words ending at the further first test signal, and in that each further first score is formed from the sum of the score at the end of a sequence, from the first score, and from the relevant language model value.

8. A device recognizing a sequence of words in a speech signal comprising:

input means for receiving a speech signal;

sampling means fed by said input means for at recurrent sampling said speech signal and at each instant;

matching and scoring means fed by said sampling means and provided with first storage means for storing a unitary set of series of reference signals, each such series representing a vocabulary word, and second storage means for storing a set of n-gram (n≧2) language model scores, each score pertaining to a substring of (n) most recent vocabulary words;

first score means fed by said matching and scoring means for, at a particular first test signal, assigning a first score to any string of preliminary recognized words terminating at said first test signal;

second score means fed by said first score means and by said second storage means, for incrementing any such first score by the appropriate language model score pertaining to the n most recently recognized vocabulary words of said string;

memory means for storing incremented scores and associated words and backpointers;

selecting means fed by said first memory means for selecting minimal score strings among those coexistently assigned and incremented by said first and second score means; and output means fed by said selecting means for outputting a selected absolute minimal score string for further usage.

* * * * *